United States Patent [19]

Feldman-Schorrig

[11] Patent Number: 5,135,401
[45] Date of Patent: Aug. 4, 1992

[54] PICTORIAL WARDROBE PLANNER

[76] Inventor: Sara Feldman-Schorrig, P.O. Box 6937, Beverly Hills, Calif. 90212-6937

[21] Appl. No.: 692,156

[22] Filed: Apr. 26, 1991

[51] Int. Cl.$^5$ .......................................... G09B 25/00
[52] U.S. Cl. .................... 434/395; 446/149; 40/159; 434/367; 434/428
[58] Field of Search ............... 434/75, 80, 367, 377, 434/395–400, 402, 428, 429; 446/147–152; 40/159, 395, 404

[56] References Cited

U.S. PATENT DOCUMENTS

| 510,599 | 12/1893 | Harrison | 446/149 |
| 805,432 | 11/1905 | Freeman | 434/399 X |
| 1,089,922 | 3/1914 | Garman | 446/149 |
| 2,121,246 | 6/1938 | Gordon | 434/367 |
| 2,285,379 | 6/1912 | Sherman | 434/367 |
| 4,854,880 | 8/1989 | Nasby | 434/402 X |

FOREIGN PATENT DOCUMENTS

| 499469 | 1/1954 | Canada | 434/367 |
| 1195057 | 6/1965 | Fed. Rep. of Germany | 446/147 |
| 427744 | 4/1935 | United Kingdom | 434/398 |

Primary Examiner—Gene Mancene
Assistant Examiner—L. Thomas
Attorney, Agent, or Firm—Poms, Smith, Lande & Rose

[57] ABSTRACT

An apparatus is disclosed for containing and displaying photographs of the items of clothing and related articles contained within a user's wardrobe. The apparatus includes leaves for holding and displaying photographs and a binder for holding the leaves and for grouping the leaves into tiers whereby a photograph in one tier can be compared and viewed with various photographs in the other tiers.

9 Claims, 1 Drawing Sheet

PICTORIAL WARDROBE PLANNER

FIELD OF THE INVENTION

This invention relates in general to album binders, particularly to album binders for holding removable photographs, and specifically to a photograph album for holding photographs of the user's wardrobe in order to assist the user in selecting an ensemble of clothes.

BACKGROUND OF THE INVENTION

Every working woman is familiar with the daily task of trying to assemble an outfit for the day early in the morning while rushing to leave the house. Commonly proposed solutions by leading fashion magazines have been wardrobes consisting solely of dresses and already matched two-piece outfits. However, such a solution severely limits one's creativity and inhibits the free expression of one's mood.

Alternatively, if one has accumulated a series of attractive, but not necessarily matching, separates, as is usually the case, one inevitably runs into the obstacle that items that are not seen are forgotten. Once again, a commonly proposed partial remedy, consists of attempting to make one's wardrobe more visible, for example by avoiding "double hangings" and unnecessarily high shelves.

It is therefore an object of the present invention to provide a means whereby persons may easily view the entire contents of their wardrobe and contemplate many combinations of various items without physically removing or viewing those items in the wardrobe.

SUMMARY OF THE INVENTION

The invention is essentially an album type binder having a plurality of pages which can be turned so that selected pages can be viewed. The pages are separated into two or more vertical sections, layers or tiers so that the pages of selected tiers can be viewed together. Each tier would contain a multiplicity of pages, ideally in an amount comparable to the number of items in the user's wardrobe. Each side of a page is adapted to hold a photograph of one item from the user's wardrobe. The album is organized so that the top tier could contain photographs of the user's blouses or shirts, the middle tier could contain photographs of the user's skirts or pants, and the bottom tier could contain photographs of the user's shoes. Thereby, by selecting pages of the various tiers for viewing, one can assemble one of innumerable permutations of an ensemble for critical viewing and selection.

In a broad aspect of the present invention, the pictorial wardrobe planner album includes pages for containing and displaying photographs of items of a user's wardrobe and a binder for binding pages in a plurality of tiers. A photograph in one tier can be viewed simultaneously with selected photographs from each of the other tiers.

In accordance with another aspect of the present invention, a divider is utilized which divides or segregates the photographs in the various tiers into groups. For example, two dividers, which extend across all the tiers, can divide the photographs into groups of formal wear, day wear, and lounge wear.

Other objects, features and advantages of the invention will become apparent from a consideration of the following detailed description and the accompanying drawings.

DETAILED DESCRIPTION

Figures 1, 2:
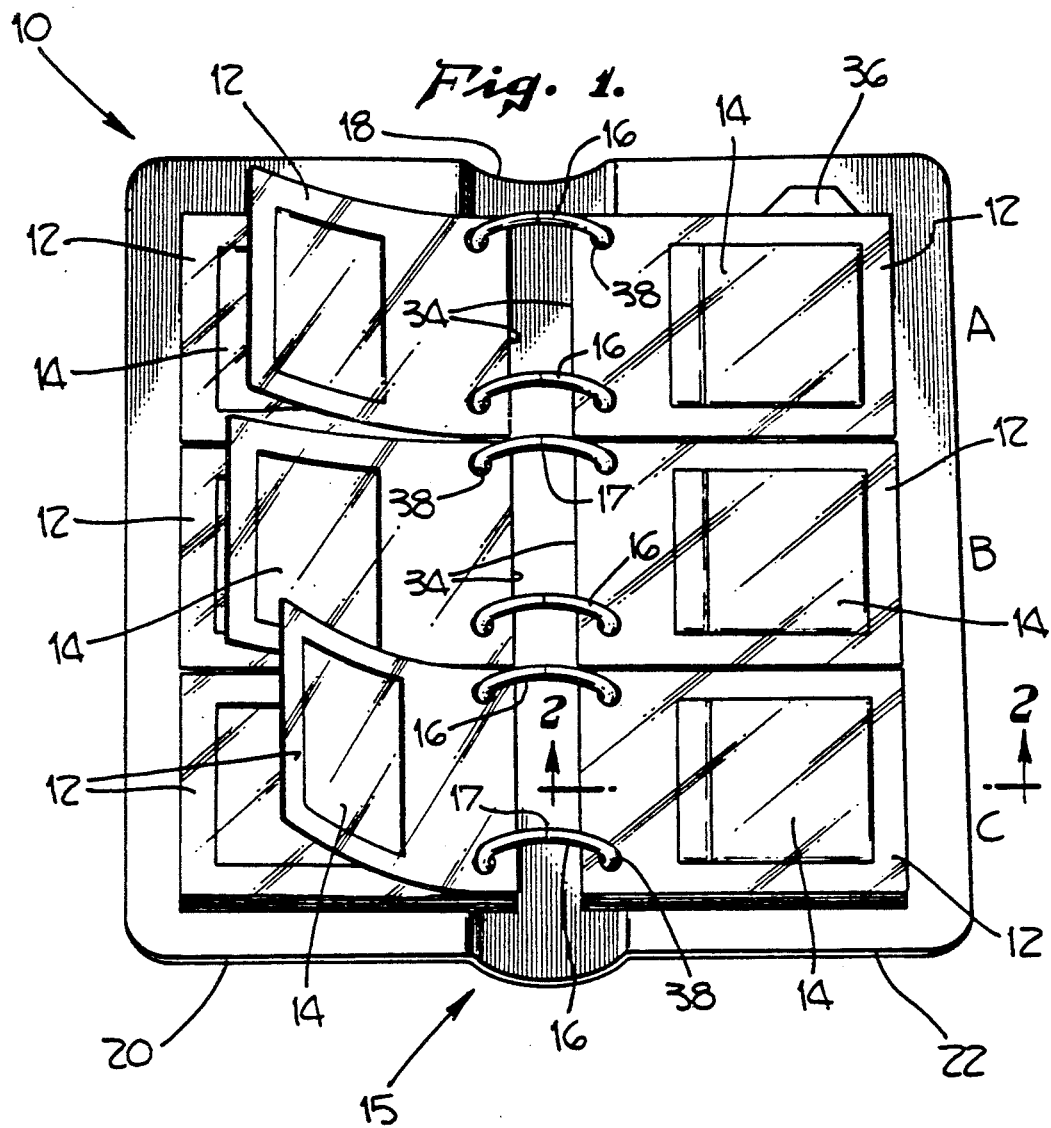
FIG. 1 is a front view of a pictorial wardrobe planner.
FIG. 2 is a cut-away view taken along line 2—2 of an individual photograph holder and photograph.

A preferred embodiment of a pictorial wardrobe album, indicated generally as 10, is depicted in FIG. 1. The album 10 is comprised of means for holding photographs, shown as individual pages or leaves 12 and means for binding the pages, shown as a ring binder 15. Photographs 14 are secured within the leaves 12. The preferred mode of securing is a ring binder as shown in FIG. 1; however, other means such as those discussed below can be used.

The binder 15 can be any of the various types of binders commonly known and used to hold sheets of paper or backing material for mounting photographs including ring binders as shown in FIG. 1 and book binding of the type used to bind a common book. The binder 15 includes binder rings 16 which are attached to a spine 18. The rings 16 are separable at break 17 in order to make the pages 12 removable. Removability of the pages 12 is optional. Left and right covers 20 and 22 respectively are flexibly attached to the spine 18. The covers 20 and 22 can be closed in a book-like fashion.

An individual leaf or page 12 is comprised of a top sheet 24 and a bottom sheet 26 which are joined at joint 28 as can be best seen in FIG. 2. A photograph 14 is removably sandwiched between the top sheet 24 and the bottom sheet 26. Preferably, both top sheet 24 and bottom sheet 26 are formed of a clear plastic or vinyl material. Top sheet 24 and bottom sheet 26 are also joined together along edges 30 and 32. When a leaf 12 is removed from rings 16, a photograph 14 can be slid through the opening formed at edge 34. The two rings 16 which pass through openings 38 prevent the photograph 14 from passing back through the opening formed at edge 34.

Alternatively, two photographs may be placed between the top and bottom sheet with the face of one photograph towards the top sheet 24 and the face of the other photograph towards the bottom sheet 26. In that matter, the photographs could be grouped with, for example, photographs of casual wear being displayed through the bottom sheets and formal wear being displayed through the top sheets.

Alternatively, the bottom sheet 26 of an individual leaf or page 12 could be formed of an opaque material with only the top sheet 24 being clear in order to permit viewing of the photograph 14. Instead of the top sheet 24 and the bottom sheet 26 being joined along three sides as discussed above, the top and bottom sheets could be joined along one edge 28 with the surface of the bottom sheet upon which the photographs rest being tacky to hold the photograph in place and also to hold the top sheet 24 securely over the photograph. Other means of mounting photographs on a sheet or page for displaying could also be utilized.

If only the front side of a page is used for displaying a photograph, the backside of a page could be used for displaying information about the item shown in the photograph. For example, such information as the item's location, date of purchase, and/or cleaning instructions. This information could be written on the back of the photograph and displayed through a clear bottom sheet 26 or displayed directly on an opaque bottom sheet.

As can be best seen in FIG. 1, the leaves 12 and the photographs 14 within them are arranged in three tiers or stacks in a row indicated generally as A, B, and C. Each tier is comprised of two binding rings 16 which confine the leaves 12 and the photographs 14 within them to a particular tier. Within a tier the individual leaves may be turned like pages in a book to expose different photographs within the tier for viewing. The leaves 12 of each tier may be turned independently of the leaves of the other two tiers. In this manner, for example, a photograph in tier A can be compared with various photographs in tiers B and C.

Divider 36 is preferably constructed of one piece of plastic with six appropriately placed holes for each of the rings 16 to pass through and spans all three tiers. Therefore, if the divider is moved from the right side of the binder to the left side all the photographs in all of the tiers which are in front of the binder are also moved to the left side and thereby a new group of photographs in the three tiers is then exposed. Divider 36 is used to partition the three tiers. For example, divider 36 could be used to divide work clothes from evening wear. It is contemplated that multiple dividers could be used.

In practice, a user would place a photograph of each item contained in her wardrobe in an appropriate leaf 12. The photographs within a tier would be of related articles of clothing. For example, tier A could be used for displaying photographs of jackets and sweaters, (outer wear for the upper torso) tier B could be used to contain photographs of blouses, (inner wear for the upper torso) and tier C could contain photographs of skirts or slacks (clothes for the lower body). A divider 36 could be used to separate work clothes from evening clothes and a second divider could be used to segregate day wear.

To utilize the pictorial wardrobe planner, the user could move the tab 36 to expose, for example, photographs of evening wear. The user could then select a particular item in tier A to compare with various items in tier B and also particular or various items in tier C. In that manner, for example, various jacket, blouse, and skirt combinations could be explored without the necessity of trying them on or laying them out on a bed. Further, the user would have every item of her wardrobe available for examination and contemplation in combination with every other item contained in her wardrobe. This would be particularly useful if some of the clothes are stored in a location difficult to reach or get to.

Alternatively, more or less than three tiers of leaves could be used. For example, a fourth tier could be added for photographs of shoes. Also, the photographs would preferably be of the Polaroid Instamatic type which the user could take inexpensively.

It is to be understood that the disclosed apparatus is merely illustrative of the principles of the present invention which could be implemented by other types of structures constructed of different materials. Accordingly, the scope of the present invention is not limited to the embodiments as shown in the drawings and specifically described herein.

I claim:

1. A pictorial album comprising:
    a binder;
    at least two separate stacks of a plurality of pages positioned in a row in the binder; and
    a plurality of photographs of articles of clothing owned by the user with one of said photographs contained within each page;
    wherein the photographs in each stack are of related articles of clothing so that by selectively viewing selected pages from each stack of pages, the user can visualize a selected combination of clothing items.

2. A pictorial album as defined in claim 1 wherein said binder is a ring binder.

3. A pictorial album as defined in claim 2 wherein said ring binder includes:
    a spine;
    a plurality of binder rings attached to said spine; and
    left and right covers attached to opposite sides of said spine.

4. A pictorial album as defined in claim 1 wherein each page has a top sheet and a bottom sheet each having four sides with said top sheet joined to said bottom sheet at three of said four sides and with holes located adjacent to said fourth side on both said top and bottom sheets.

5. A pictorial wardrobe planner for displaying the contents of a user's wardrobe and for permitting the user to view the items of the wardrobe in various combinations comprising:
    photographs of the items contained in a user's wardrobe;
    a plurality of pages containing and displaying said photographs; and
    a binder containing said plurality of pages in a plurality of separate tiers while permitting a photograph within one tier to be viewed simultaneously with a photograph from each of the other tiers.

6. A pictorial wardrobe planner as defined in claim 5 wherein the photographs within a tier are of related articles of clothing.

7. A pictorial wardrobe planner as defined in claim 5 further including one or more dividers which span across all of said plurality of tiers for segregating said photographs into clothing items useful for different occasions.

8. A pictorial wardrobe planner as defined in claim 5 wherein said pages each have a front side and a back side and each of said pages contains and displays one of said photographs through its front side and another of said photographs through its back side.

9. A pictorial wardrobe planner as defined in claim 5 wherein said pages each have a front and a back side and each of said pages contains and displays one of said photographs through its front side and said back side displays information about the item shown in the photograph.

* * * * *